(12) United States Patent
Sugahara

(10) Patent No.: US 6,909,784 B1
(45) Date of Patent: Jun. 21, 2005

(54) RECORDING APPARATUS AND RECORDING METHOD OF ELECTRONIC WATERMARK

(75) Inventor: Takayuki Sugahara, Yokosuka (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 756 days.

(21) Appl. No.: 09/597,160

(22) Filed: Jun. 20, 2000

(30) Foreign Application Priority Data

Jun. 25, 1999 (JP) .......................................... 11-179596

(51) Int. Cl.[7] .............................. G06K 9/00; G06K 9/36; H04L 9/00
(52) U.S. Cl. ....................... 380/201; 382/100; 382/232; 713/176; 705/57; 705/58; 705/59
(58) Field of Search ................... 380/201, 54; 713/176; 705/57–59; 382/100, 232

(56) References Cited

U.S. PATENT DOCUMENTS

| | | | |
|---|---|---|---|
| 6,449,378 B1 * | 9/2002 | Yoshida et al. | 382/100 |
| 6,453,053 B1 * | 9/2002 | Wakasu | 382/100 |
| 6,510,233 B1 * | 1/2003 | Nakano | 382/100 |
| 6,678,389 B1 * | 1/2004 | Sun et al. | 382/100 |

FOREIGN PATENT DOCUMENTS

JP         2000013765 A  *  1/2000  ............ H04N/7/08

OTHER PUBLICATIONS

Owaga et al., "A Copyright Information Embedding Method Using DCT for Digital Movies," (Thesis SCIS'97–31G published in Japan on Jan. 29, 1997—English translation Abstract provided).

Ohnishi et al., "A Watermarking Scheme to Image Data by PN Sequence," (Thesis SCIS'97–26B published in Japan on Jan. 29, 1997—English translation Abstract provided).

* cited by examiner

*Primary Examiner*—Ayaz Sheikh
*Assistant Examiner*—Brandon Hoffman
(74) *Attorney, Agent, or Firm*—Connolly Bove Lodge & Hutz LLP

(57) ABSTRACT

A detector (1) of signal detects an electronic watermark (first electronic watermark) signal from an inputted contents data. The detected electronic watermark signal is temporarily stored in a memory (2) for electronic watermark contents. The temporary stored electronic watermark signal is transmitted to an inserter (4) of electronic watermark signal. In the inserter (4), an electronic watermark (second electronic watermark) signal of which content is equivalent to the detected electronic watermark (first electronic watermark) signal is additionally recorded in a contents signal, which is extracted by a extractor (3) of contents signal.

6 Claims, 3 Drawing Sheets

RECORDING APPARATUS AND RECORDING METHOD OF ELECTRONIC WATERMARK

BACKGROUND OF THE INVENTION

1. Field of the Invention

The present invention relates to a recording of contents information recorded with an electronic watermark signal therein, particularly, relates to a recording apparatus and a recording method of an electronic watermark, wherein an electronic watermark signal is always held when a part of contents information is extracted and recorded.

2. Description of the Related Art

An electronic watermark is a technique of embedding a certain information in a multimedia data such as image and sound and concealing the certain information. Various methods of concealing are provided.

The NTT Human Interface Laboratory reported "An Embedding Method of Copyright Information using DCT for Digital Moving Pictures" in the SCIS'97-31G. It proposes the method of embedding information in the MPEG (Moving Picture Experts Group) code, particularly, the method of embedding information based upon alteration of DCT (discrete cosine transform) coefficient, a motion vector and quantization characteristics.

The Defense Academy of Japan reported "A Method of Signing Watermark on a Picture by PN Succession" in the SCIS'97-26B. It proposes the method of diffusing a picture signal by the PN succession and synthesizing a signature information with the picture in accordance with the direct diffusion method.

G. Caronni proposed that a tag, which is a small geometrical pattern, be added to an electronically processed picture in an intensity level, which is hardly perceived visibly, is proposed in the thesis titled "Assuring Ownership Rights for Digital Images" in the Proc. Reliable IT Systems, VIS '95, 1995. A method of embedding an electronic watermark signal, which resembles to quantization noise is described in the theses "Embedding Secret Information into a Dithered Multi-level Image" in the IEEE Military Comm. Conference, pp. 216–220, 1990 by K. Tanaka and "Video-steganography" in the IMA Intellectual Property Proc., VI, pp. 187–206, 1994 by K. Mitsui et al. respectively.

A method of inserting an electronic watermark signal into a pixel allocated in a vicinity of an outline of a picture in the least significant bit is described in the thesis titled "Cryptology for Digital TV Broadcasting", Proc. Of the IEEE, 83(6), pp. 944–957, 1995, by Macq and Quisquater.

A statistical method called "patchwork" and a method of utilizing a random texture pattern, which is shown in a picture called "texture block coding" is explained in the thesis titled "Techniques for Data Hiding", Proc. of SPIE, v2420, page 40, July 1995, by W. Bender et al.

MPEG signal, which is one of compressed signals, to be inserted with an electronic watermark signal is depicted next. Essentially MPEG is a name of an organization, "Moving Picture Experts Group". However, it currently represents standards or specifications for coding signals. Accordingly, MPEG is composed of several techniques FIG. 6 shows a block diagram of the MPEG encoder according to the prior art.

In FIG. 6, the MPEG encoder comprises a predictor 41 for motion compensation, a subtracter 42, a discrete cosine transformer (DCT) 43, a quantizer 44, a VLC (variable length coder) 45, a buffer 46, an inverse-quantizer 47, an inverse-DCT 48, an adder 49 and a memory 50 for picture.

In the subtracter 42, a difference between an input picture signal and a locally decoded picture, which is predicted for motion compensation by the predictor 41, is subtracted from the input pickup signal. Accordingly, a time redundancy portion is deleted from the input picture signal. There exist 3 modes of predicting directions "past", "future" and "both past and future". Further, these modes can be used by switching each macro block (MB) of 16 pixels multiplied by 16 pixels. A direction of prediction is decided by a picture-type given to the input picture signal. There exists 2 modes of "predicting from past" and "encoding an MB independently without predicting" in a predictive coded picture (P-picture). There exists 4 modes of predicting future", "past", "both past and future" and "encoding a MB independently without predicting" in a bi-directionally predictive coded picture (B-picture). Furthermore, encoding all MBs independently is an intra-coded picture (I-picture).

A motion vector is detected with the accuracy of half pel or half-pixel after performing a pattern matching of a motion area at each MB and motion compensation is predicted by shifting it with a motion component. There exists 2 directions of horizontal and vertical in a motion vector. The direction is transmitted as an additional information of MB in conjunction with a motion compensation (MC) mode, which indicates a prediction. From a first I-picture to a picture preceding a second I-picture is called a group of pictures (GOP). In a case that the GOP is used in storage media such as an optical recording medium and a magnetic recording medium, approximately 15 pictures are used in general.

A differential picture is orthogonally transformed in the DCT 43. According to MPEG, the 2-dimentional DCT is applied to a DCT block of 8×8 with dividing one MB into 4. Generally, a video ail signal contains more low frequency components and less high frequency components, so that DCT coefficients converge into low frequency components if the DCT is applied.

The picture data (DCT coefficient) applied by the DCT is quantized by the quantizer 44.

The quantized data is processed with the variable length coding (VLC) by the VLC 45.

The data coded by VLC is temporarily stored in the buffer 46 and outputted as a coded data in a predetermined transfer rate. A generated coding amount per MB of the data to be outputted is transferred to a code amount limiter not shown. The code amount limiter controls a quantizing scale by feeding an error code amount, which is a difference between the generated code amount and a target code amount, back to the quantizer 44 for controlling the generated code amount.

Further, the quantized picture data is inversely quantized by the inverse-quantizer 47 and inversely discrete cosine transformed by the inverse-DCT 48, and temporarily stored in the memory 50 through the adder 49, and then the quantized picture data is used in the predictor 41 for motion compensation as reference of a decoding picture or a local decoding picture so as to calculate a differential picture.

The coded data outputted from the buffer 46 is decoded through an inverse process of coding.

FIG. 7 shows a block diagram of the MPEG decoder according to the prior art.

In FIG. 7, the MPEG decoder comprises a variable length decoder (VLD) 51, an inverse-quantizer 52, an inverse-DCT 53, an adder 54, a memory 55 for a picture and a predictor 56 for motion compensation.

With respect to an insertion frequency of electronic watermark signals in the prior art mentioned above, it depends upon the application. For example, in the case of picture data, electronic watermark signals are scattered by using several frames of pictures. In this case, it shall be a configuration of combining several frames. Otherwise there exists a problem that an electronic watermark signal cannot be read out. Further, a case that an electronic watermark signal is recorded in one frame at each of several frames can be considered. In this case, there exists another problem that an electronic watermark signal may disappear from a frame recorded with an electronic watermark signal if a frame not recorded with an electronic watermark signal is extracted.

An electronic watermark signal is not always recorded in a data, which is extracted from a specific area in a frame, even though an electronic watermark signal is recorded in each frame.

Furthermore, in a case of audio data, there exists a case that electronic watermark signals are scattered in the audio data using a specific number of samples. In this case, it shall be a configuration of combining the specific number of samples. Otherwise an electronic watermark signal cannot be read out.

SUMMARY OF THE INVENTION

Accordingly, in consideration of the above-mentioned problems of the prior art, an object of the present invention is to provide a recording apparatus and a recording method of an electronic watermark, which can hold an electronic watermark signal of which content is always equivalent to a first electronic watermark signal while extracting a contents data of a smaller amount of information than a predetermined unit of information from an original contents data wherein the original contents data is recorded with the first electronic watermark signal by each or throughout the predetermined unit of information.

In order to achieve the above object, the present invention provides, according to an aspect thereof, a recording apparatus of an electronic watermark comprising a detecting device for detecting a first electronic watermark signal from an original contents data inputted, a memory device for storing the first electronic watermark signal detected by the detecting device temporarily, an extracting device for extracting a part of contents data from the original contents data and an inserting device for recording a second electronic watermark signal of which content is equivalent to that of the first electronic watermark signal detected by the detecting device in the contents data extracted by the extracting device.

According to another aspect of the present invention, a recording method of an electronic watermark is provided including: a step of detecting a first electronic watermark signal from an original contents data inputted, a step of storing the first electronic watermark signal detected in the step of detecting temporarily, a step of extracting a part of contents data from the original contents data and a step of inserting a second electronic watermark signal of which content is equivalent to that of the first electronic watermark signal in the contents data extracted in the step of extracting.

Other objects and further features of the present invention will be apparent from the following detailed description when read in conjunction with the accompanying drawings.

DETAILED DESCRIPTION OF THE PREFERRED EMBODIMENTS

Figure 1:
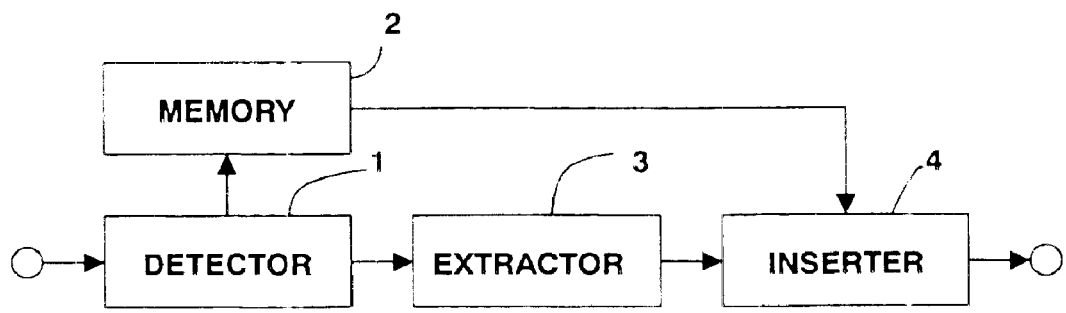
FIG. 1 shows a block diagram of a recording apparatus of an electronic watermark according to a first embodiment of the present invention.

FIG. 1 shows a block diagram of a recording apparatus of an electronic watermark according to a first embodiment of the present invention.

In FIG. 1, a recording apparatus comprises a detector 1 of signal, a memory 2 for electronic watermark contents, an extractor 3 of contents signal and an inserter 4 of electronic watermark.

A contents information is inputted into the detector 1 and an electronic watermark (first electronic watermark) signal is detected from the inputted contents information in the detector 1. The detected electronic watermark signal is temporarily stored in the memory 2. The inputted contents information is transmitted to the extractor 3 thereafter. In the extractor 3, a part of contents signal is extracted from an original contents signal. In a case of a picture signal, for example, a specific frame signal is extracted from an original picture signal. In a case of an audio signal, a specific part of audio signal is extracted from an original audio signal.

The electronic watermark signal temporarily stored in the memory 2 is transmitted to the inserter 4. In the inserter 4, an electronic watermark (second electronic watermark) signal of which content is equal to that of the detected electronic watermark (first electronic watermark) signal is additionally recorded in the contents signal extracted by the extractor 3.

In a case that a contents signal is a picture data, an electronic watermark signal is scattered in several frames by using some frames of a picture by an electronic watermark system as mentioned above, that is, an electronic watermark signal is recorded over some frames of picture. In this case, the picture data shall be a configuration of combining several frames. Otherwise the electronic watermark signal cannot be read out. Further, another case can be considered were an electronic watermark is recorded in one frame at each of several frames. In this case, if a frame signal not recorded with an electronic watermark signal is extracted, the frame signal disappear from the picture data, which is extracted by the electronic watermark signal, as a matter of fact. Furthermore, an electronic watermark signal is not always recorded in data, which is extracted from a specific area in a frame, even though an electronic watermark signal is recorded at each frame. Moreover, in a case of audio data, an electronic watermark signal is scattered by using a specific number of sample in the same manner as the case of picture data. In this case, the audio data shall be a configuration of combining a specific number of samples. Otherwise the electronic watermark signal cannot be read out.

In order to solve these problems, the inserter 4 shown in FIG. 1 records a new electronic watermark signal (second electronic watermark signal) of which content is equivalent to that of an originally recorded electronic watermark signal (first electronic watermark signal) by using a method of a less data amount of contents data necessary for inserting an electronic watermark or a less sampling number than that of the originally recorded electronic watermark (first electronic watermark) signal.

As an actual example, an original electronic watermark signal is scattered into 15 frames and the electronic watermark signal is recorded in a low signal level in consideration of deterioration of picture quality. When detecting such an electronic watermark signal, electronic signals of 15 frames are integrated and the integrated electronic signal is detected with increasing a signal to noise ratio (SIN) of the signal level. In a case that only one frame of signal is extracted from a picture data recorded with an electronic watermark signal being scattered throughout 15 frames and recorded, an electronic watermark information recorded in the frame can not be detected. Accordingly, the original electronic watermark signal is previously stored in the memory 2 and a new electronic watermark signal of which content is equal to that of the original electronic watermark signal is produced, and then the new electronic watermark signal is recorded in the extracted one frame of the picture data with a higher signal level.

Figure 2:
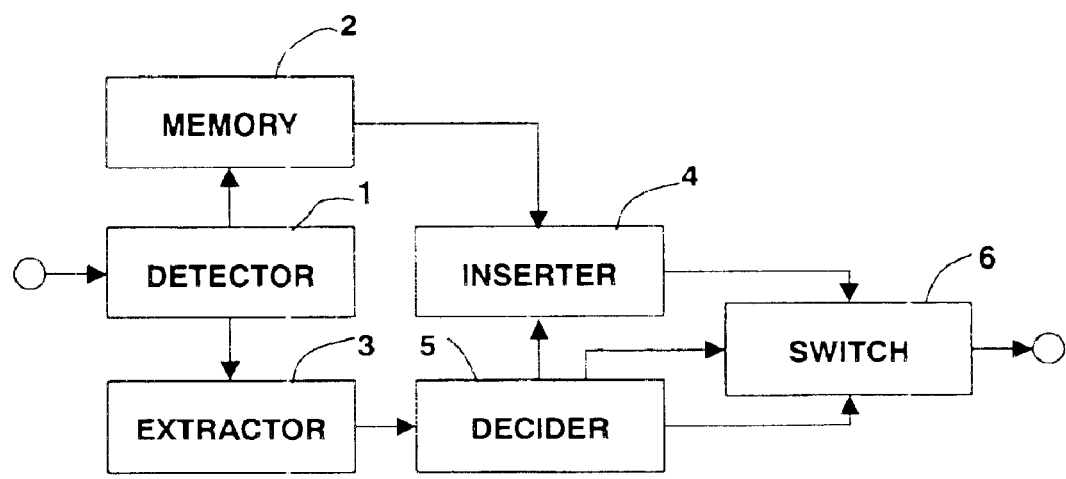
FIG. 2 shows a block diagram of a recording apparatus of an electronic watermark according to a second embodiment of the present invention.

FIG. 2 shows a block diagram of a recording apparatus of an electronic watermark according to a second embodiment of the present invention.

In FIG. 2, a recording apparatus of an electronic watermark comprises a detector 1 at of signal, a memory 2 for electronic watermark contents, an extractor 3 of contents signal, an inserter 4 of electronic watermark signal is temporarily stored in the memory 2. The inputted contents information is transmitted to the extractor 3 thereafter. In the extractor 3, a part of a contents signal exists from an original contents signal.

A contents information is inputted into the detector 1 and an electronic watermark (first electronic watermark) signal is detected from the inputted contents information in the detector 1. The detected electronic watermark signal is temporarily stored in the memory 2. The inputted contents information is transmitted to the extractor 3 thereafter. In the extractor 3, a part of a contents signal is extracted from an original contents signal.

The electronic watermark signal temporarily stored in the memory 2 is transmitted to the inserter 4.

The contents signal extracted by the extractor 3 is judged by the decider 5 whether or not an electronic watermark signal is recorded. A result of judgement is transferred to the switch 6. In a case that the extracted contents signal is judged as being recorded with an electronic watermark signal, the switch 6 is connected to the decider 5 and the contents signal extracted by the extractor 3 is outputted as it is.

In a case that the extracted contents signal is judged as not being recorded with an electronic watermark signal, the switch 6 is connected to the inserter 4 and the contents signal recorded by the inserter 4 with the new electronic watermark signal (second electronic watermark signal) of which content is equal to that of the first electronic watermark signal is outputted through the switch 6.

In the second embodiment, it is assumed that a contents data is a picture data and the picture data is recorded with a first electronic watermark signal at each predetermined number of pictures or throughout the predetermined number of pictures. In a case that a picture data of less number of pictures than the predetermined number of pictures is extracted from an original picture data, a second electronic watermark signal of which content is equivalent to that of the first electronic watermark can be recorded in the extracted picture data in a less number of pictures than the predetermined number of pictures.

In a case that a picture data of a smaller area than a predetermined area is extracted from an original picture data recorded with a first electronic watermark signal in each predetermined area or throughout the predetermined area, a second electronic watermark signal of which content is equivalent to that of the first electronic watermark signal can be recorded in the extracted picture data in the smaller area than the predetermined area.

Further, in a case that a contents data is an audio data and an audio data of a less number of samples than a predetermined number of samples is extracted from an original audio data recorded with a first electronic watermark signal in each predetermined number of samples or throughout the predetermined number of samples, a second electronic watermark signal of which content is equivalent to that of the first electronic watermark signal can be recorded in the extracted audio data, wherein the second electronic watermark is recordable in a less number of samples than the predetermined number of samples.

Furthermore, with assuming that a contents data is other data than picture such as a letter and an audio data, in a case that a contents data of a less number of samples than a predetermined number of samples is extracted from an original contents data recorded with a first electronic watermark signal in each predetermined number of samples or throughout the predetermined number of samples, a second electronic watermark signal of which content is equivalent to that of the first electronic watermark signal can be recorded in the extracted contents data in a less number of samples than that the predetermined number of samples.

Figure 6:
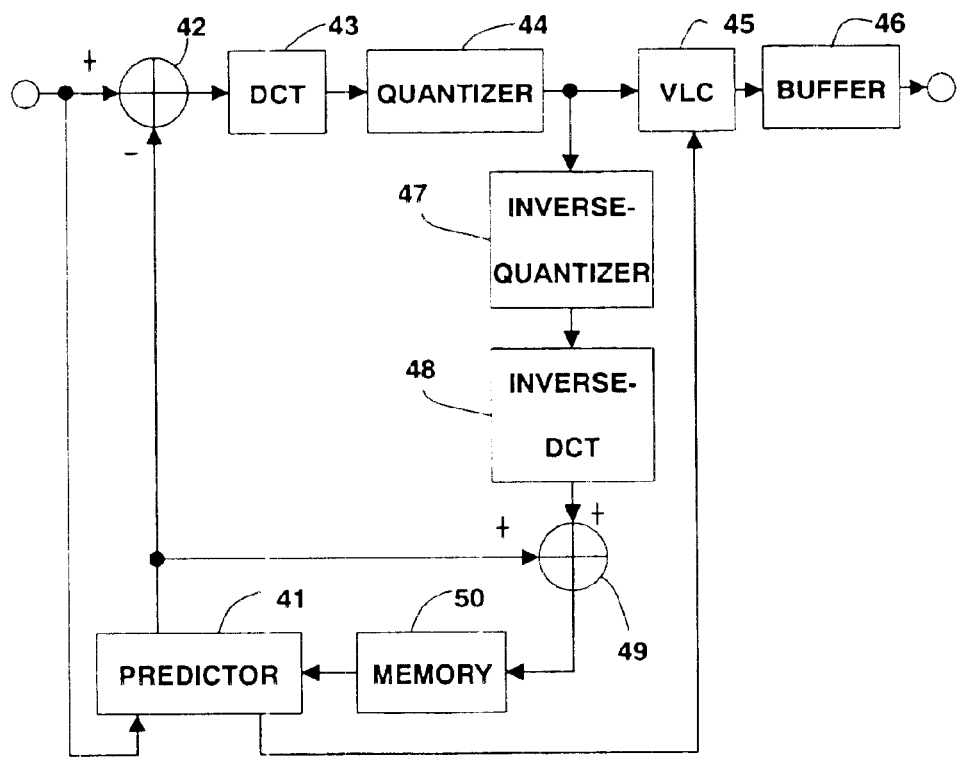
FIG. 6 shows a block diagram of the MPEG encoder according to the prior art.
Figure 7:
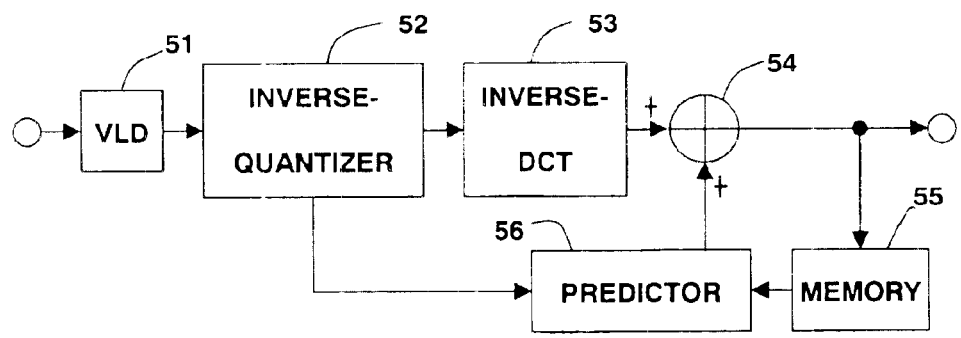
FIG. 7 shows a block diagram of the MPEG decoder according to the prior art.

This embodiment is an application of adopting the MPEG encoder shown in FIG. 6 and the MPEG decoder shown in FIG. 7 in a recording apparatus of an electronic watermark.

Figure 3:
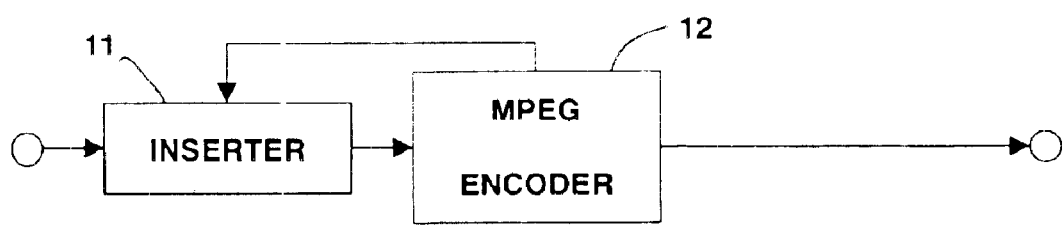
FIG. 3 shows a block diagram of an encoding section in a recording apparatus of an electronic watermark according to a third embodiment of the present invention.

FIG. 3 shows a block diagram of an encoding section in a recording apparatus of an electronic watermark according to a third embodiment of the present invention.

Figure 4:
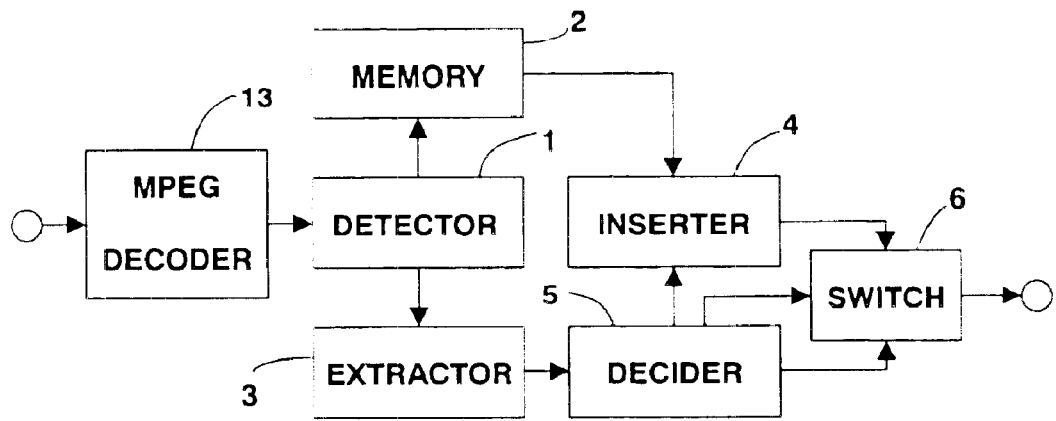
FIG. 4 shows a block diagram of a decoding section in a recording apparatus of an electronic watermark according to the third embodiment of the present invention.

FIG. 4 shows a block diagram of a decoding section in a recording apparatus of an electronic watermark according to the third embodiment of the present invention.

In FIG. 3, an encoding section of a recording apparatus of an electronic watermark comprises an inserter 11 of an electronic watermark signal and an MPEG encoder 12. As shown in FIG. 3, the inserter 11 receives an intra-coded picture (intra-picture) location signal from the MPEG encoder 12 and records an electronic watermark signal if an inputted contents information is an intra-picture. Essentially, an intra-picture is distributed with a maximum amount of codes and is coded in picture quality of a highest S/N. Accordingly, it is considered that strong tolerance to an electronic watermark signal, which is hardly disappeared by a compression encoding. Finally, a compressed contents information is outputted from the MPEG decoder 12.

In FIG. 4, a decoding section of the recording apparatus of an electronic watermark comprises an MPEG decoder 13, a detector 1 of signal, a memory 2 for electronic watermark contents, an extractor 3 of contents signal, an inserter 4 of electronic watermark, a decider 5 for judging whether or not an electronic watermark signal exists and a switch.

As shown in FIG. 4, a contents information compressed by the encoding section shown in FIG. 3 is transmitted to the MPEG decoder 13 and decoded through the MPEG decoding process, and then the compressed contents information becomes an input contents information and transmitted to the detector 1. An electronic watermark signal is detected from the input contents information by the detector 1, in other words, an electronic watermark signal recorded in an intra-picture is detected. The detected electronic watermark signal (first electronic watermark signal) is temporarily stored in the memory 2. The input contents information is transmitted to the extractor 3 thereafter. A part of a contents signal is extracted from an original contents signal in the extractor 3.

On the other hand, the electronic watermark signal stored temporarily in the memory 2 is transmitted to the inserter 4.

The contents signal extracted from the input contents information by the extractor 3 is judged by the decider 5 whether or not an electronic watermark signal is recorded. A result of judgement is transmitted to the switch. In a case that an electronic watermark signal is recorded, the switch 6 is connected to the decider 5 and the contents signal extracted by the extractor 3 is outputted as it is.

In a case that an electronic watermark signal is not recorded, the switch 6 is connected to the inserter 4. A contents signal recorded by the inserter 4 with a new electronic watermark signal (second electronic watermark signal) of which content is equal to that of a first electronic watermark signal is outputted through the switch 6.

Figure 5:
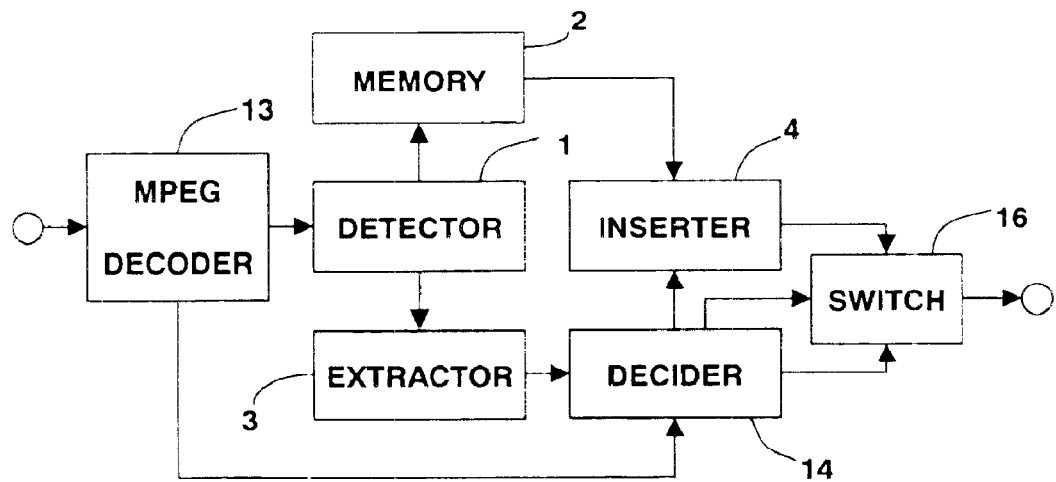
FIG. 5 shows a block diagram of a decoding section in a recording apparatus of an electronic watermark according to a fourth embodiment of the present invention.

FIG. 5 shows a block diagram of a decoding section in a recording apparatus of an electronic watermark according to a fourth embodiment of the present invention.

A recording apparatus in this embodiment utilizes a signal, which indicates an intra-picture outputted from an MPEG encoder.

In FIG. 5, a recording apparatus of an electronic watermark comprises an MPEG decoder 13, a detector 1 of signal, a memory 2 for electronic watermark contents, an extractor 3 of contents signal, an inserter 4 of electronic watermark, a decider 14 for judging a picture type and a switch 16.

As shown in FIG. 5, a contents information compressed by the encoding section shown in FIG. 3 is transmitted to the MPEG decoder 13. The MPEG decoder 13 transmits a picture-type information contained in the inputted compressed contents information, which is a picture signal of compression encoded by the MPEG system, to the decider 14. A contents signal extracted by the extractor 3 is judged by the decider 14 whether or not the contents signal is an intra-picture on a basis of the picture-type information. A result of judgment is transmitted to the switch 16. In a case that it is judged as an intra-picture, the switch 16 is connected to the decider 14. The contents signal extracted by the extractor 3, that is, a picture signal being inserted with an electronic watermark signal and judged as an intra-picture is outputted as it is.

In a case that it is judged as not an intra-picture, the switch 16 is connected to the inserter 4. In the inserter 4, a new electronic watermark signal (second electronic watermark signal) of which content is equivalent to that of a first electronic watermark signal supplied by the memory 2 is recorded in the extracted contents signal, that is, a picture signal of not being an intra-picture. The contents signal recorded with the second electronic watermark signal is outputted through the switch 16. The other blocks shown in FIG. 5, which are not depicted in this embodiment, are the same functions as those of the third embodiment shown in FIG. 4.

The third and fourth embodiments shown in FIGS. 3 through 5 disclose that an electronic watermark signal is recorded in an intra-picture of which picture quality is most improved with the MPEG compression. In a case of extracting other picture data than an intra-picture when decoding, a new electronic watermark signal of which content is equivalent to that of an electronic watermark signal originally recorded in the intra-picture is recorded in the picture data to be extracted. Accordingly, an electronic watermark signal can be recorded efficiently and contents of the electronic watermark signal can be held even though data of a specific part of a contents information, which is compression encoded by the MPEG system, is extracted.

As mentioned above, according to the present invention, an electronic watermark signal of which content is equivalent to that of a first electronic watermark signal can always be held in an extracted contents data, while extracting the contents data of less amount of information than a predetermined unit of information from an original contents data recorded with the first electronic watermark signal in each predetermined unit of information or throughout the predetermined unit of information.

What is claimed is:

1. A recording apparatus of an electronic watermark comprising:

detecting means for detecting a first electronic watermark signal from inputted original contents data, wherein the first electronic watermark signal is scattered into a plurality of information units of the original contents data;

memory means for storing the first electronic watermark signal detected by said detecting means;

extracting means for extracting a part of the contents data from the original contents data;

deciding means for judging whether or not the first electronic watermark signal exists in the part of contents data extracted by said extracting means;

inserting means for inserting a second electronic watermark signal, having a content that is equivalent to that of the first electronic watermark signal detected by said detesting means, into the part of contents data extracted by said extracting means; and switching means for outputting either:

(a) the part of the contents data extracted by said extracting means in the event the deciding means judges that the first electronic watermark signal exists in the part of contents data; or (b) the part of contents data inserted with the second electronic watermark signal by said inserting means in the event the deciding means judges that the first electronic watermark signal does not exist in the part of contents data.

2. The recording apparatus of an electronic watermark in accordance with claim 1, said recording apparatus further comprising MPEG encoder means, MPEG decoder means and another inserting means for receiving an intra-coded picture location signal from the MPEG encoder means, wherein said inserting means records the first electronic watermark signal in case the original contents, data is an intra-picture.

3. A recording method of an electronic watermark comprising steps of:

detecting a first electronic watermark signal from inputted original contents data, wherein the first electronic watermark signal is scattered into a plurality of information units of the original contents data;

storing the first electronic watermark signal detected in said detecting step;

extracting a part of contents data from the original contents data;

judging whether or not the first electronic watermark signal exists in the part of contents data extracted in said extracting step;

inserting a second electronic watermark signal, having a content that is equivalent to that of the first electronic watermark signal, into the of contents data extracted in said extracting step; and outputting either;

(a) the part of contents data extracted in said extracting step in the event the deciding means judges that the first electronic watermark signal exists in the part of contents data; or (b) the part of contents data inserted with the second electronic watermark signal in said inserting step in the event the deciding means judges that the first electronic watermark signal does not exist in the part of contents data.

4. A recording apparatus of an electronic watermark comprising:

detecting means for detecting a first electronic watermark signal from inputted original contents data, wherein the first electronic watermark signal is intermittently recorded during every interval of a plurality of information units of the original contents data;

memory means for storing the first electronic watermark sigal detected by said detecting means;

extracting means for extracting a part of contents data from the original contents data;

deciding means for judging whether or not the first electronic watermark signal exists in the part of contents data extracted by said extracting means;

inserting means for inserting a second electronic watermark signal, having a content that is equivalent to that of the first electronic watermark signal detected by said detecting means, into the part of contents data extracted by said extracting means; and switching means for outputting either;

(a) the part of contents data extracted by said extracting means-n the event the deciding means judges that the first electronic watermark-signal exists in the part of contents data; or (b) the part of contents data insured with the second electronic watermark signal by said inserting means in the event the deciding means judges that the fist electronic watermark signal does not exist in the part of contents data.

5. The recording apparatus of an electronic watermark in accordance with claim 4, said recording apparatus flier comprising: MPEG encoder means, MPEG decoder means and another inserting means for receiving an intra-coded picture location signal from the MPEG encoder means, wherein said inserting means records the first electronic watermark signal in case the original contents data is an intra-picture.

6. A recording method of an electronic watermark comprising steps of:

detecting a first electronic watermark sigal from inputted original contents data, wherein the first electronic watermark signal is recorded during every interval of a plurality of information units of the original contents data;

storing the first electronic watermark signal detected in said detecting step;

extracting a part of contents data from the original contents data;

judging whether or not the first electronic watermark signal in the part of contents data extracted in said extracting step;

inserting a second electronic watermark signal, having a content that is equivalent to that of the first electronic watermark signal, into the part of contents data extracted in said extracting step, and outputting either;

(a) the part of contents data extracted in said extracting step in the event the deciding means judges that the first electronic watermark signal exists in the tart of contents data; or (b) the part of contents data inserted with the second electronic watermark signal in said inserting step in the event the deciding means judges that the first electronic watermark signal does not exist in the part of contents data.

* * * * *

UNITED STATES PATENT AND TRADEMARK OFFICE
CERTIFICATE OF CORRECTION

PATENT NO. : 6,909,784 B1
DATED : June 21, 2005
INVENTOR(S) : Takayuki Sugahara

It is certified that error appears in the above-identified patent and that said Letters Patent is hereby corrected as shown below:

Column 8,
Line 42, "detesting" should read -- detecting --.

Column 9,
Line 10, after "the" insert -- part --;
Line 31, "sigal" should read -- signal --.

Column 10,
Line 3, "insured" should read -- inserted --;
Line 9, "flier" should read -- further --;
Line 18, "sigal" should read -- signal --;
Line 27, after "signal" insert -- exists --;
Line 37, "tart" should read -- part --.

Signed and Sealed this

Sixth Day of September, 2005

JON W. DUDAS
*Director of the United States Patent and Trademark Office*